United States Patent
Geller

(10) Patent No.: US 9,434,378 B2
(45) Date of Patent: Sep. 6, 2016

(54) SYSTEM AND METHOD FOR IMPROVING THE VEHICLE FEEL, FUEL EFFICIENCY AND PERFORMANCE OF A HYBRID VEHICLE

(71) Applicant: Toyota Motor Engineering & Manufacturing North America, Inc., Erlanger, KY (US)

(72) Inventor: Benjamin M. Geller, Hermosa Beach, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/581,558

(22) Filed: Dec. 23, 2014

(65) Prior Publication Data
US 2016/0176394 A1    Jun. 23, 2016

(51) Int. Cl.
*B60W 20/00*    (2006.01)

(52) U.S. Cl.
CPC .................................... *B60W 20/40* (2013.01)

(58) Field of Classification Search
CPC .................................................. B60W 20/40
See application file for complete search history.

(56) References Cited

U.S. PATENT DOCUMENTS

| | | | |
|---|---|---|---|
| 6,629,027 B2 | 9/2003 | Yamaguchi et al. | |
| 7,360,615 B2 | 4/2008 | Salman et al. | |
| 7,400,113 B2 | 7/2008 | Osborne | |
| 8,145,397 B2 | 3/2012 | Heap et al. | |
| 8,467,924 B2 | 6/2013 | Shiba | |
| 8,473,136 B2 | 6/2013 | Kato et al. | |
| 8,534,399 B2 | 9/2013 | Soliman et al. | |
| 8,672,805 B2 | 3/2014 | Akebono et al. | |
| 8,688,299 B2 | 4/2014 | Saito et al. | |
| 8,718,847 B2 | 5/2014 | Itagaki | |
| 8,718,857 B2 | 5/2014 | Perkins et al. | |
| 8,755,961 B2 | 6/2014 | Yamada et al. | |
| 8,781,659 B2 | 7/2014 | Kim | |
| 2008/0091364 A1 | 4/2008 | Lim et al. | |
| 2013/0030635 A1 | 1/2013 | Morita | |
| 2013/0073136 A1* | 3/2013 | Yamamoto et al. | ............ 701/22 |
| 2013/0103203 A1 | 4/2013 | Masuda et al. | |
| 2013/0190132 A1 | 7/2013 | Izawa | |
| 2014/0180515 A1* | 6/2014 | Ueda | ...................... B60K 6/442 701/22 |
| 2014/0365057 A1* | 12/2014 | Arita | ................... B60W 20/104 701/22 |

* cited by examiner

*Primary Examiner* — Yuen Wong
(74) *Attorney, Agent, or Firm* — Snell & Wilmer LLP

(57) ABSTRACT

A system for providing a smoother vehicle response when transitioning a hybrid vehicle having a transmission, a battery and a fuel converter from an EV driving mode to a HV driving mode. The system includes a memory for storing an amount of force to be applied to the transmission for a given pedal input and a given vehicle speed. The system also includes a BMU for determining a state of charge of the battery and for determining a proportional scaling number based on the state of charge. The system also includes an ECU for determining a scaled drive force based on the amount of force to be applied to the transmission and the proportional scaling number and for controlling the utilization of the battery and the fuel converter based on the scaled drive force when the state of charge of the battery is within a low power range.

23 Claims, 5 Drawing Sheets

400

PROPORTIONAL SCALING MAP

| STATE OF CHARGE | PROPORTIONAL SCALING NUMBER |
|---|---|
| 10% | 1.0 |
| 20% | 1.1 |
| 30% | 1.5 |
| 40% | 2.0 |

DRIVE FORCE MAP

| AMOUNT OF FORCE (N) | | VEHICLE SPEED (kph) | | | |
|---|---|---|---|---|---|
| | | 0 | 10 | 20 | ... |
| PEDAL INPUT (%) | 0 | 1000 | 500 | 0 | ... |
| | 10 | 2500 | 2500 | 2000 | ... |
| | 20 | 3000 | 3000 | 2500 | ... |
| | 30 | 3500 | 3500 | 3000 | ... |
| | ... | ... | ... | ... | ... |

SYSTEM AND METHOD FOR IMPROVING THE VEHICLE FEEL, FUEL EFFICIENCY AND PERFORMANCE OF A HYBRID VEHICLE

BACKGROUND

1. Field

The present invention relates to a system and method for improving the vehicle feel, fuel efficiency and performance of a hybrid vehicle.

2. Description of the Related Art

A hybrid vehicle (HV) has an internal combustion engine and an electric motor that are each used to power the vehicle. The HV also has an energy storage device that provides power to the electric motor and is typically recharged using regenerative braking. A plug-in hybrid vehicle (PHV) also has an internal combustion engine and an electric motor that are each used to power the vehicle. The PHV has a built-in energy storage device that allows it to be charged using an external power source (e.g., a power supply at a charging station). A fuel cell vehicle (FCV) or a fuel cell electric vehicle (FCEV) uses a fuel cell to power its on-board electric motor. Fuel cells in vehicles create electricity to power an electric motor, generally using oxygen from the air and hydrogen. The term "vehicle" and "hybrid vehicle" will be used herein to refer to these types of vehicles.

Hybrid vehicles have an electric vehicle (EV) driving mode and a hybrid vehicle (HV) driving mode. The EV driving mode means that only the electric motor is used to power the hybrid vehicle. The HV driving mode means that only the internal combustion engine or the fuel cell is used to power the hybrid vehicle. Generally, the EV driving mode provides a more responsive feel than the HV driving mode.

In order to achieve a desired fuel efficiency or vehicle performance, an electronic control unit (ECU) is used to automatically switch from the EV driving mode to the FIV driving mode and vice versa. Currently, ECUs use complicated rules and logic algorithms (not dependent on the state of charge) to determine whether to transition from one driving mode to another driving mode. The ECUs perform these calculations and automatically determine whether to switch from one driving mode to another driving mode. Sometimes when the ECUs switch from one driving mode to another driving mode, the timing is not always predictable and the transition is not well defined and not very smooth. Also, with the currently used rules and logic algorithms, the EV driving mode does not provide the driver with a smooth and responsive feel.

Thus, there is a need for hybrid vehicles that provide better transitions and more predictable timing between EV and HV driving modes, provide better fuel economy and efficiency and provide an improved vehicle feel between EV and HV driving modes that is logical and predictable.

SUMMARY

A system for providing a smoother vehicle response when transitioning a hybrid vehicle having a transmission, a battery and a fuel converter from an EV driving mode to a HV driving mode is disclosed. The system includes a memory for storing an amount of force to be applied to the transmission for a given pedal input and a given vehicle speed and for storing a scaling number for a given state of charge. The system also includes a battery management unit for determining a state of charge of the battery and for determining a proportional scaling number based on the state of charge. The system also includes an electronic control unit for determining a scaled drive force based on the amount of force to be applied to the transmission and the proportional scaling number and for controlling the utilization of the battery and the fuel converter based on the scaled drive force when the state of charge of the battery is within a low power range.

A hybrid vehicle for providing a smoother vehicle response when transitioning from an EV driving mode to a HV driving mode is disclosed. The hybrid vehicle includes a transmission, a battery for storing energy and for providing power to the transmission and a fuel converter for providing energy to the battery and for providing power to the transmission. The hybrid vehicle also includes a memory for storing a drive force map that provides an amount of force to be applied to the transmission for a given pedal input and a given vehicle speed and for storing a proportional scaling map that provides a scaling number for a given state of charge. The hybrid vehicle also includes a battery management unit for determining a state of charge of the battery and for determining, using the proportional scaling map, a proportional scaling number based on the state of charge. The hybrid vehicle also includes an electronic control unit for determining a scaled drive force based on the amount of force to be applied to the transmission and the proportional scaling number and for controlling the utilization of the battery and the fuel converter based on the scaled drive force when the state of charge of the battery is within a low power range.

A method for providing a smoother transition when transitioning from an EV mode to a HV mode of a hybrid vehicle. The method includes storing, in a memory coupled to an electronic control unit, an amount of force to be applied to a vehicle transmission for a given vehicle speed and a given pedal input. The method also includes determining, using a battery management unit, a state of charge of a battery used to power the vehicle transmission and a proportional scaling number based on the state of charge. The method also includes determining, using the electronic control unit, a scaled drive force based on the amount of force and the proportional scaling number and controlling the utilization of the battery and a fuel converter based on the scaled drive force when the state of charge of the battery is within a low power range. The proportional scaling number varies throughout the low power range to provide a smoother vehicle response when transitioning from the EV driving or operating mode to the HV driving or operating mode.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The systems, ECUs and methods described herein provide hybrid vehicles with a smoother vehicle response when transitioning from an EV driving or operating mode to a HV driving or operating mode. Also, the vehicle performance response to the driver request is dependent on and is based at least partially on the available state of charge of the battery. The systems, ECUs and methods provide several benefits and advantages such as an improved and differing vehicle feel between EV and HV driving modes that is logical and predictable, better transitions and more predictable timing between EV and HV driving modes that are dependent on state of charge (SOC), improved fuel economy and efficiency, and utilization of state of charge as an indicator of available EV performance. Dependence on the state of charge provides several benefits and advantages such as a more accurate correlation with real vehicle capabilities, an improved driver recognition of available vehicle feel and/or performance and variable but predictable vehicle performance in a wider range of conditions. In addition, the systems, ECUs and methods provide the hybrid vehicles with expanded capabilities, such as an increase in EV and HV performance, when more SOC is available to the vehicles.

An exemplary system includes a transmission, a battery and a fuel converter such as an internal combustion engine or a fuel cell. The system also includes a memory for storing an amount of force to be applied to the transmission for a given pedal input and a given vehicle speed and for storing a scaling number for a given state of charge. The system also includes a battery management unit (BMU) for determining a state of charge (SOC) of the battery and for determining a proportional scaling number based on the state of charge. The system also includes an electronic control unit (ECU) for determining a scaled drive force based on the amount of force to be applied to the transmission and the proportional scaling number and for controlling the utilization of the battery and the fuel converter based on the scaled drive force when the state of charge of the battery is within a low power range.

Figure 1:
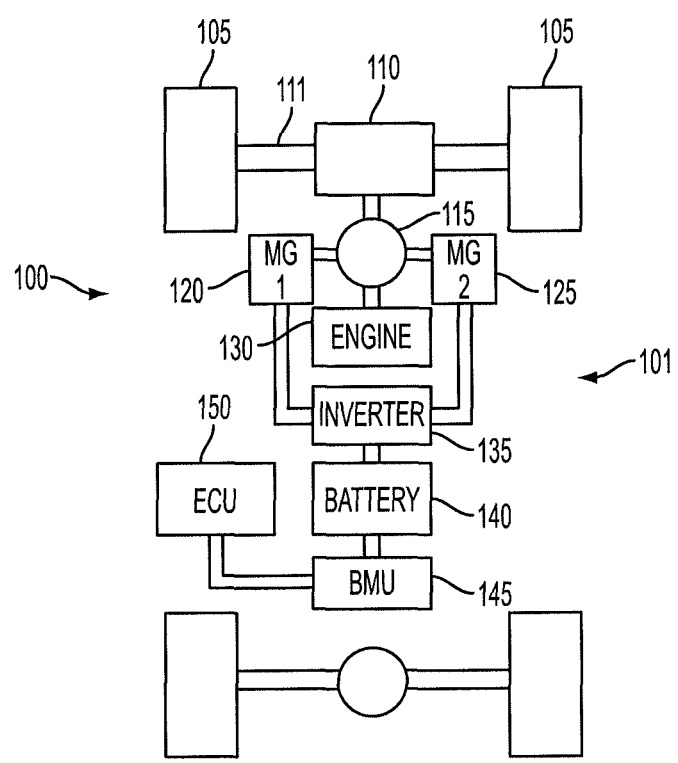
FIG. 1 illustrates a block diagram of a system for a hybrid vehicle according to an embodiment of the present invention.

FIG. 1 illustrates a block diagram of a system 101 for a hybrid vehicle 100 according to an embodiment of the present invention. The hybrid vehicle 100 can be a HV, a PHV, a FCV, a FCEV and other similar vehicles. The system 101 includes a transmission 110 (e.g., a continuously variable transmission (CVT)), a drive axle 111, a power splitting device 115, motor-generators (MG1 and MG2) 120 and 125, an internal combustion engine 130, an inverter 135 and a battery 140 (or batteries). The engine 130 and the motor-generators 120 and 125 are mechanically connected to the drive axle 111 via the transmission 110. In one embodiment, MG1 120 is used to recharge the battery 140 and supply electric power to directly drive MG2 125. A fuel cell can be used in place of the engine 130. The term "engine" will be used in this disclosure but one skilled in the art will know how to utilize a fuel cell in place of the engine 130. In addition, the term "fuel converter" will be used to refer to a device that receives fuel and converts the fuel into energy or power. Examples of a fuel converter include, but are not limited to, an internal combustion engine and a fuel cell.

By regulating the amount of electric power generated, MG1 120 can control the transmission 110. MG2 125 can be used to drive the wheels 105. In one embodiment, the motor-generators 120 and 125 can be replaced with an electric motor. The motor generators 120 and 125 (or an electric motor) and the engine 130 can be used individually or simultaneously to drive the wheels 105 of the hybrid vehicle 100. The electric motor can supplement the engine 130 and/or serve as a generator to recharge the battery 140 while the vehicle 100 is operating. The power splitting device 115 is used to switch operations from the engine 130 to the motor-generators 120 and 125 and vice versa. The inverter 135 is used to convert AC and DC current between MG1 120, MG2 125 and the battery 140.

Figures 2, 3:
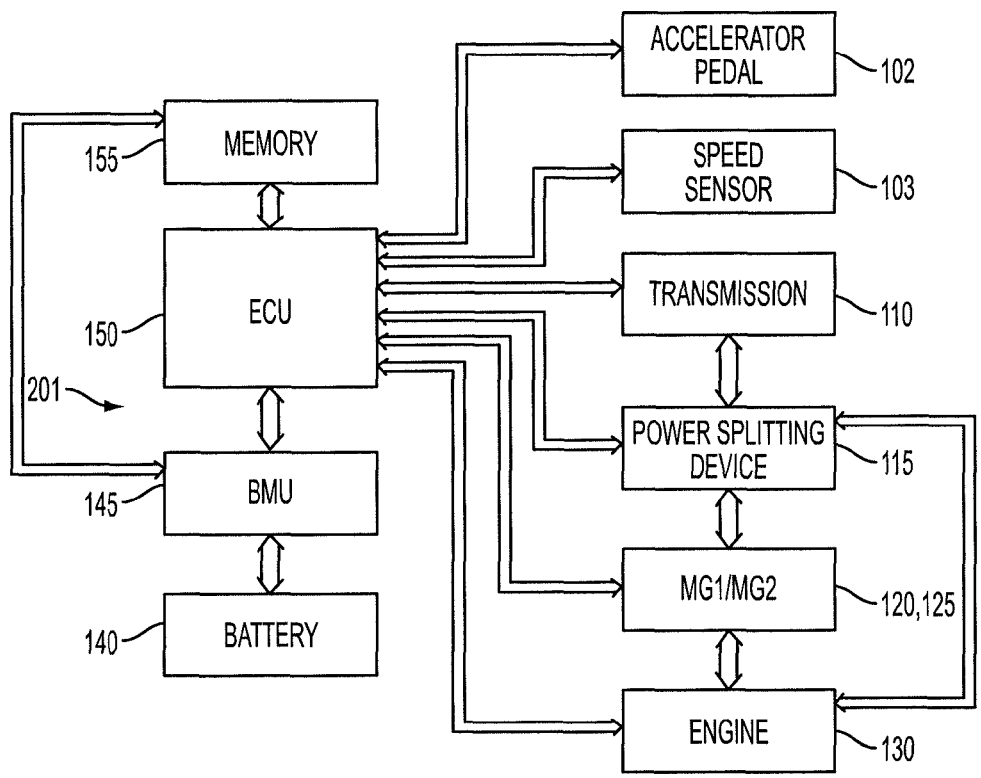
FIG. 2 illustrates a block diagram of a system for a hybrid vehicle according to an embodiment of the present invention.
FIG. 3 is a table showing exemplary values for a drive force map according to an embodiment of the present invention.

FIG. 2 illustrates a block diagram of a system 201 for a hybrid vehicle 100 according to an embodiment of the present invention. The system 201 includes a battery management unit (BMU) 145, an electronic control unit (ECU) 150, a memory 155, an accelerator pedal 102, a speed sensor 103 and some of the components shown in FIG. 1.

The accelerator pedal 102 generates or produces a pedal input, which is a value representing an amount or percentage the accelerator pedal 102 is depressed. A driver of the vehicle 100 uses the accelerator pedal 102 to control the acceleration or movement of the vehicle 100.

The speed sensor 103 determines a speed (in mph or kph) of the vehicle 100. The speed sensor 103 can be coupled to the transmission 110, the rear differential assembly or the wheel assembly and is electrically connected with the ECU 150. The speed sensor 103 is configured to determine or sense a speed of the vehicle.

The memory 155 is connected to the ECU 150 and is used to store vehicle settings and parameters such as states (e.g., the current SOC and the full SOC) of the battery 140. The memory 155 also stores a drive force map 300 (see FIG. 3) and a proportional scaling map 400 (see FIG. 4).

FIG. 3 is a table showing exemplary values for the drive force map 300 according to an embodiment of the present invention. The drive force map 300 provides a drive force or an amount of force to be applied to the transmission 110 for a given pedal input and a given vehicle speed. The drive force map 300 is a table that includes a drive force or an amount of force value for various combinations of given pedal inputs and given vehicle speeds.

As an example, a pedal input of 20 percent and a vehicle speed of 10 kph results in a drive force of 3,000 Newtons. If the pedal input and/or the vehicle speed is between the values in the table, the ECU 150 will interpolate the drive force. For example, a pedal input of 18 percent and a vehicle speed of 8 kph may result in the ECU 150 interpolating the drive force to be 2,800 Newtons (N). The data in the table and the interpolated values may be stored in the memory 155 and retrieved by the ECU 150.

The ECU 150 receives a value of the pedal input from the accelerator pedal 102 and the speed of the vehicle 100 from the speed sensor 103, retrieves, looks up or interpolates an amount of force value from the drive force map 300 based on or corresponding to the value of the pedal input and the speed of the vehicle 100 and then provide the amount of force to be applied to the transmission 110 to the motor-generators 120 and 125 and/or the engine 130 to drive the vehicle 100. The functions and operations of the ECU 150 can be implemented using software, hardware and combinations thereof.

The BMU 145 is used to monitor various parameters or states of the battery 140 such as voltage, current, temperature and state of charge (SOC) of the battery 140. The BMU 145 also calculates, retrieves or interpolates a proportional scaling number based on the SOC of the battery 140. The functions and operations of the BMU 145 can be implemented using software, hardware and combinations thereof.

Figures 4, 5:
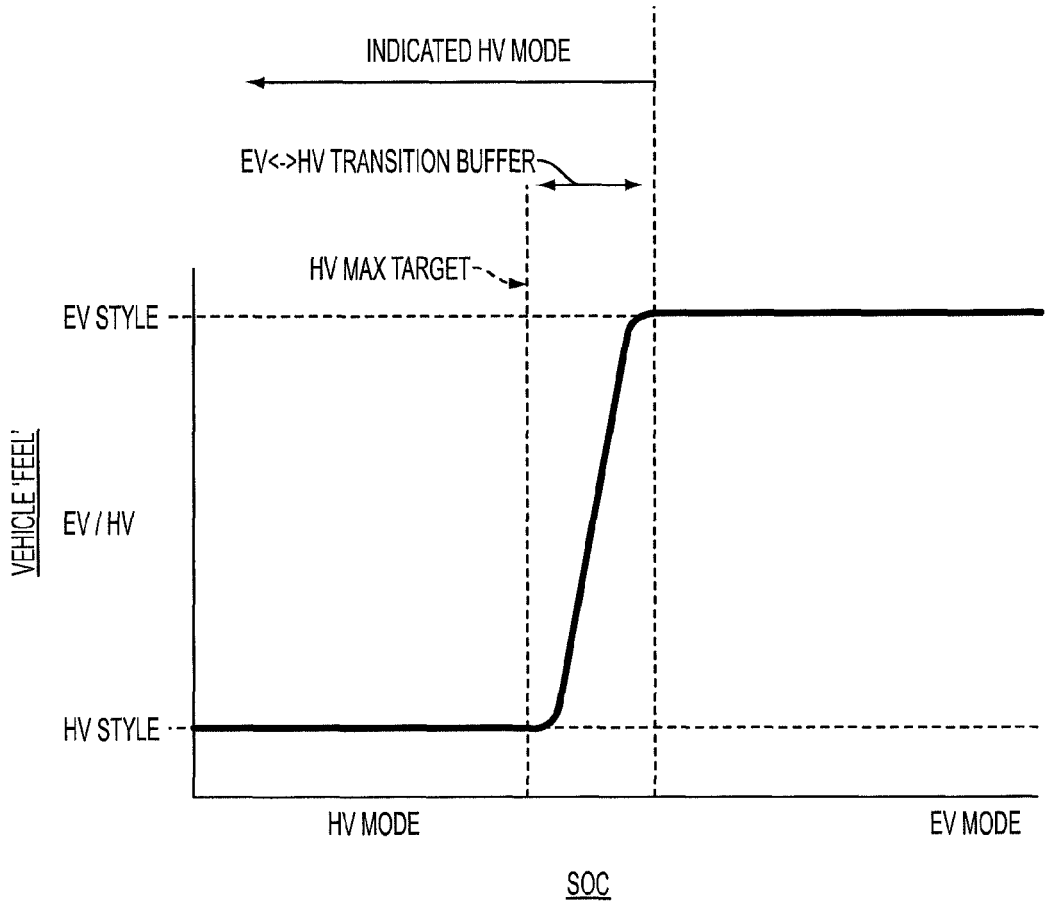
FIG. 4 is a table showing exemplary values for a proportional scaling map according to an embodiment of the present invention.
FIG. 5 shows a graph of the vehicle feel versus the SOC of the battery according to an embodiment of the present invention.

FIG. 4 is a table showing exemplary values for the proportional scaling map 400 according to an embodiment of the present invention. The proportional scaling map 400 includes exemplary values for the proportional scaling number based on the SOC of the battery 140. In one embodiment, the proportional scaling number varies from 1 to 2 depending on the value of the SOC. As an example, an SOC of 20 percent results in a proportional scaling number of 1.1. If the SOC is 24 percent, the BMU 145 will interpolate the proportional scaling number to be between 1.1 and 1.5, for example, 1.25. The data in the table and the interpolated values may be stored in the memory 155 and retrieved by the ECU 150.

The proportional scaling number is a value, percentage or proportion that is applied to (e.g., multiplied by) the amount of force in the drive force map 300 to produce a scaled drive force. The scaled drive force is a value representing how much force to apply to the motor(s) 120 and/or 125 and the engine 130. In one embodiment, the proportional scaling number is applied to the amount of force only when the current SOC of the battery 140 is within the low power range (e.g., the transition buffer).

The proportional scaling number being greater than 1 enhances the drive force and thus advantageously allows the driver to have a better vehicle feel and performance during the transition from the EV driving mode to the HV driving mode. The proportional scaling number can vary non-linearly or linearly throughout a low power range (e.g., when the SOC is between 20-30 percent of the total SOC) of the battery 140 to provide a smoother vehicle response and transition when moving from the EV driving mode to the HV driving mode (see transition buffer in FIG. 5). The BMU 145 or the ECU 150 may adjust or apply a smoothing function to the proportional scaling numbers and/or the scaled drive force throughout the entire low power range to produce smooth power being delivered to the engine 130 and the motors 120 and 125 so that no abrupt changes to the drive force occur, resulting in better vehicle feel, performance and fuel economy. In one embodiment, ECU 150 adjusts the proportional scaling numbers and/or the scaled drive force values throughout the entire low power range to allow for a smooth curve (an example is shown in FIG. 5).

The low power range is defined to be when the vehicle 100 is transitioning from the EV driving mode to the HV driving mode and/or vice versa. The low power range can be stored in the memory 155 and retrieved by the ECU 150. As an example, the low power range is generally set to be between 10-40 percent of the total SOC and preferably set to be between 20-30 percent of the total SOC. The low power range is generally preset at the manufacturing factory but can be set by the driver with limitations (such as range cannot be greater than 20 percent wide and the high end of range cannot exceed 40 percent of the total SOC) imposed by the BMU 145 or the ECU 150. The non-linear relationship between the proportional scaling number and the SOC of the battery 140 allows for a better and smoother transition from the EV driving mode to the HV driving mode. Fuel efficiency is also improved due to the smooth transition. The low power range being well defined allows for the driver to experience smoother transitions and more predictable timing when changing modes from the EV driving mode to the HV driving mode and vice versa. The BMU 145 may also control the recharging of the battery 140 by redirecting the recovered energy (i.e., from regenerative braking) back into the battery 140. The BMU 145 provides this information to the ECU 150.

The ECU 150 uses the scaled drive force to determine how much to use the engine 130 and how much to use the battery 140 for powering the vehicle 100. When the SOC of the battery 140 is within the low power range, the ECU 150 utilizes the scaled drive force to provide a smoother vehicle response when transitioning from the EV driving mode to the HV driving mode.

FIG. 5 shows a graph of the vehicle feel versus the SOC of the battery 140 according to an embodiment of the present invention. The low power range is shown by the two vertical dashed lines. As an example, the low power range will be between 20-30 percent of the total SOC. When the SOC is below the low power range (e.g., below 20 percent), the ECU 150 automatically sets the driving mode to the HV driving mode. Similarly, when the SOC is above the low power range (e.g., above 30 percent), the ECU 150 automatically sets the driving mode to the EV driving mode. During the EV driving mode, the SOC of the battery 140 decreases as the vehicle is driven and is being powered by the battery 140. When the SOC of the battery 140 decreases so that it is within the low power range, the BMU 145 continuously or periodically determines or retrieves from the memory 155 (or interpolates), the proportional scaling number based on the current SOC of the battery 140. The ECU 150 receives the proportional scaling number from the BMU 145 and utilizes the proportional scaling number to determine what proportion of the battery 140 (or the electric motor) and the engine 130 should be used to power the vehicle 100. During the transition, the vehicle 100 is generally operating in the HV driving mode.

The HV max target dashed line indicates that the "EV feeling" transition is above this point. The HV max target is generally set at the manufacturing factory to indicate the maximum SOC to operate completely in the HV driving mode. That is, the HV max target indicates the normal operating bound for the HV driving mode. During normal operation of the vehicle 100 in the HV driving mode, the driver does not experience excessive transition between the HV driving mode and the EV driving mode. In one embodiment, the ECU 150 prevents the vehicle 100 from switching out of the HV driving mode (i.e., into the transition buffer) when the SOC is equal to or below the HV max target.

Figure 6A:
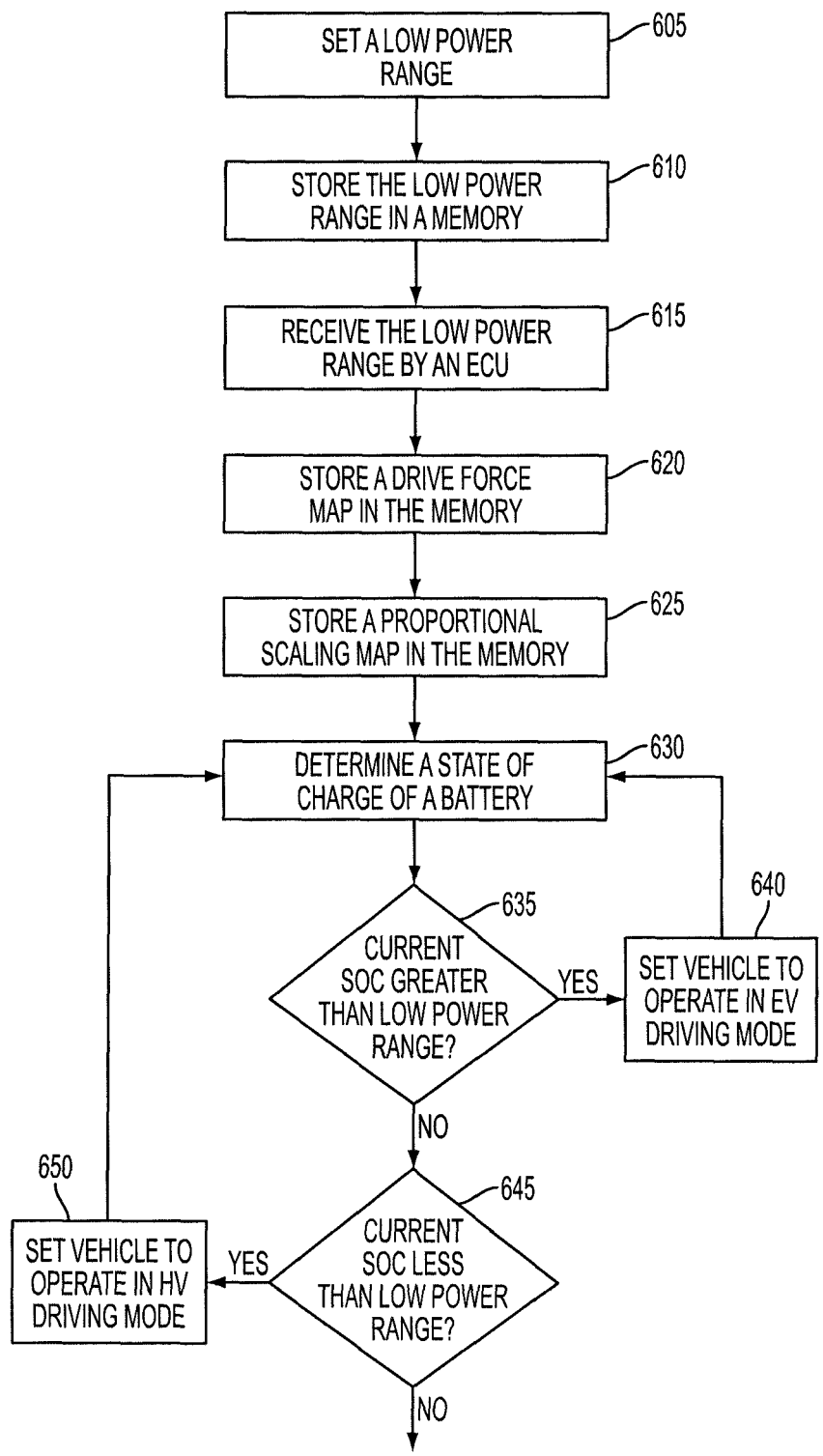
FIGS. 6A and 6B illustrate a flowchart of a method for providing a smoother transition when transitioning from an EV driving mode to a HV driving mode of a hybrid vehicle according to an embodiment of the present invention.
Figure 6B:
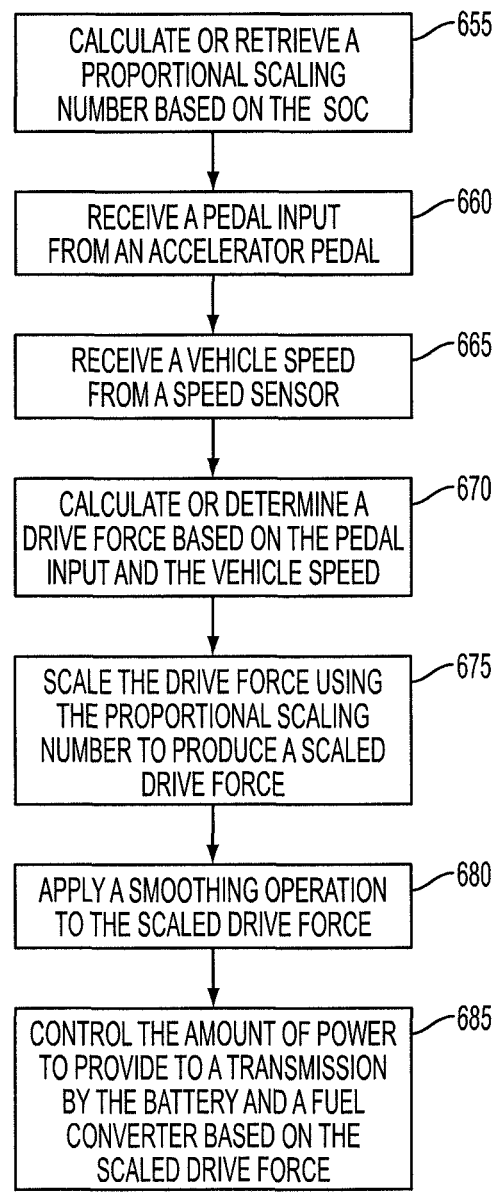

FIGS. 6A and 6B illustrate a flowchart 600 of a method for providing a smoother transition when transitioning from an EV driving mode to a HV driving mode of a hybrid vehicle 100 according to an embodiment of the present invention. Initially, the driver of the vehicle 100 may set the low power range or the low power range may be preset by the manufacturer (step 605). For example, the driver can set the low power range to be between 25-35 percent of the total SOC. The ECU 150 limits the driver from setting the low power range to be too large, for example, greater than 20 percent wide. Setting the low power range to be a fixed range allows for better transitions and more predictable timing between EV and HV driving modes. The low power range may be stored in the memory 155 (step 610). The ECU 150 receives the low power range from the driver input or receives the low power range from the memory 155 (step 615).

At step 620, the ECU 150 stores the drive force map 300 in the memory 155. The drive force map 300 may also be stored in the memory 155 at the manufacturing factory. At step 625, the ECU 150 stores the proportional scaling map 400 in the memory 155. The proportional scaling map 400 may also be stored in the memory 155 at the manufacturing factory.

At step 630, the BMU 145 or the ECU 150 continuously or periodically determines or senses a current SOC of the battery 140. If the current SOC is greater than the low power range (step 635), then the ECU 150 sets the vehicle 100 to operate in the EV driving mode (step 640). If the current SOC is less than the low power range (step 645), then the ECU 150 sets the vehicle 100 to operate in the HV driving mode (step 650).

If the current SOC of the battery 140 is within the low power range, then the ECU 150 calculates the proportional scaling number based on the current SOC of the battery 140 or retrieves or interpolates the proportional scaling number from the table 400 based on the current SOC of the battery 140 (step 655).

The ECU 150 receives a pedal input from the accelerator pedal 102 (step 660) and a vehicle speed from the speed sensor 103 (step 665). The ECU 150 determines or retrieves, from the drive force map 300, a drive force or an amount of force to be applied to the transmission 110 based on the received pedal input and the received vehicle speed (step 670).

The ECU 150 applies the proportional scaling number to the amount of force to produce a scaled drive force (step 675). The scaled drive force allows for a better vehicle feel and enhanced performance during the low power range.

In one embodiment, the ECU 150 applies a smoothing operation to the scaled drive force in order to promote controllability and expected vehicle performance by reducing abrupt changes in the vehicle response (step 680). The ECU 150 controls the amount of energy or power to provide to the transmission 110 by the battery 140 and the engine 130 (or the fuel converter) based on the scaled drive force (step 685).

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for providing a smoother vehicle response when transitioning a hybrid vehicle having a transmission, a battery and a fuel converter from an Electric Vehicle (EV) driving mode to a Hybrid Vehicle (HV) driving mode, comprising:
    a memory configured to:
        store drive force data including an amount of force to be applied to the transmission corresponding to a given pedal input and a given vehicle speed, and
        store proportional scaling data including a proportional scaling number corresponding to a given state of charge of the battery;
    a battery management unit configured to:
        determine a state of charge of the battery, and
        determine, using the stored proportional scaling data from a proportional scaling map, a proportional scaling number based on the state of charge of the battery; and
    an electronic control unit configured to:
        receive a pedal input and a vehicle speed,
        determine, using the stored drive force data, an amount of force to be applied to the transmission based on the received pedal input and the received vehicle speed,
        determine a scaled drive force by applying the determined proportional scaling number to the determined amount of force to be applied to the transmission, and
        control a utilization of the battery and the fuel converter based on the scaled drive force when the state of charge of the battery is within a low power range for transitioning the hybrid vehicle from the EV driving mode to the HV driving mode.

2. The system of claim 1, wherein the determined proportional scaling number varies throughout the low power range.

3. The system of claim 2, wherein the electronic control unit applies a smoothing operation to the determined proportional scaling number throughout the low power range.

4. The system of claim 1, wherein the fuel converter is an internal combustion engine or a fuel cell.

5. The system of claim 1, wherein the low power range is between 20 percent and 30 percent of a full state of charge of the battery.

6. The system of claim 1, wherein the low power range is between 30 percent and 40 percent of a full state of charge of the battery.

7. The system of claim 1, wherein the proportional scaling number and the corresponding state of charge of the battery have a non-linear relationship in the proportional scaling map.

8. The system of claim 1, wherein the battery management unit is configured to periodically or continuously determine the state of charge of the battery.

9. A hybrid vehicle for providing a smoother vehicle response when transitioning from an Electric Vehicle (EV) driving mode to a Hybrid Vehicle (HV) driving mode, comprising:
    a transmission;
    a battery for storing energy and for providing power to the transmission;
    a fuel converter for providing energy to the battery and for providing power to the transmission;
    a memory for storing drive force data including an amount of force to be applied to the transmission corresponding to a given pedal input and a given vehicle speed and for storing proportional scaling data including a proportional scaling number corresponding to a given state of charge of the battery;
    a battery management unit for determining a state of charge of the battery and for determining, using the stored proportional scaling data from a proportional scaling map, a proportional scaling number based on the state of charge of the battery; and
    an electronic control unit for receiving a pedal input and a vehicle speed, for determining, using the stored drive force data, an amount of force to be applied to the transmission based on the received pedal input and the received vehicle speed, for determining a scaled drive force by applying the determined proportional scaling number to the determined amount of force to be applied to the transmission, and for controlling a utilization of the battery and the fuel converter based on the scaled drive force when the state of charge of the battery is within a low power range for transitioning the hybrid vehicle from the EV driving mode to the HV driving mode.

10. The hybrid vehicle of claim 9, wherein the determined proportional scaling number varies throughout the low power range.

11. The hybrid vehicle of claim 10, wherein the electronic control unit applies a smoothing operation to the determined proportional scaling number throughout the low power range.

12. The hybrid vehicle of claim 9, wherein the fuel converter is an internal combustion engine or a fuel cell.

13. The hybrid vehicle of claim 9, wherein the low power range is between 20 percent and 30 percent of a full state of charge of the battery.

14. The hybrid vehicle of claim 9, wherein the low power range is between 30 percent and 40 percent of a full state of charge of the battery.

15. The hybrid vehicle of claim 9, wherein the proportional scaling number and the corresponding state of charge of the battery have a non-linear relationship in the proportional scaling map.

16. The hybrid vehicle of claim 9, wherein the battery management unit is configured to periodically or continuously determine the state of charge of the battery.

17. A method for providing a smoother transition when transitioning from an Electric Vehicle (EV) mode to a Hybrid Vehicle (HV) mode of a hybrid vehicle, comprising:
storing, in a memory coupled to an electronic control unit, drive force data including an amount of force to be applied to a vehicle transmission corresponding to a given vehicle speed and a given pedal input;
storing, in the memory coupled to a battery management unit, proportional scaling data including a proportional scaling number corresponding to a given state of charge of the battery;
determining, using the battery management unit, a state of charge of a battery used to power the vehicle transmission;
determining, using the stored proportional scaling data from a proportional scaling map, a proportional scaling number based on the state of charge of the battery;
determining, using the stored drive force data, an amount of force to be applied to the vehicle transmission based on a received vehicle speed and a received pedal input;
determining, using the electronic control unit, a scaled drive force by applying the determined proportional scaling number to the determined amount of force to be applied to the vehicle transmission; and
controlling, using the electronic control unit, a utilization of the battery and a fuel converter based on the scaled drive force when the state of charge of the battery is within a low power range for transitioning the hybrid vehicle from the EV driving mode to the HV driving mode.

18. The method of claim 17, further comprising applying a smoothing operation to the determined proportional scaling number throughout the low power range.

19. The method of claim 17, wherein the fuel converter is an internal combustion engine or a fuel cell.

20. The method of claim 17, wherein the low power range is between 20 percent and 30 percent of the state of charge of the battery.

21. The method of claim 17, wherein the low power range is between 30 percent and 40 percent of the state of charge of the battery.

22. The method of claim 17, wherein the proportional scaling number and the corresponding state of charge of the battery have a non-linear relationship in the proportional scaling map.

23. The method of claim 17, wherein the determining, using the battery management unit, the state of charge of the battery is performed periodically or continuously.

* * * * *